(12) United States Patent
Stentiford

(10) Patent No.: US 7,570,815 B2
(45) Date of Patent: Aug. 4, 2009

(54) COMPARING PATTERNS

(75) Inventor: Frederick W M Stentiford, Ipswich (GB)

(73) Assignee: British Telecommunications plc, London (GB)

( * ) Notice: Subject to any disclaimer, the term of this patent is extended or adjusted under 35 U.S.C. 154(b) by 1053 days.

(21) Appl. No.: 10/507,598

(22) PCT Filed: Mar. 21, 2003

(86) PCT No.: PCT/GB03/01209

§ 371 (c)(1),
(2), (4) Date: Sep. 14, 2004

(87) PCT Pub. No.: WO03/081523

PCT Pub. Date: Oct. 2, 2003

(65) Prior Publication Data

US 2005/0169535 A1    Aug. 4, 2005

(30) Foreign Application Priority Data

Mar. 22, 2002    (EP) .................... 02252097

(51) Int. Cl.
*G06K 9/68* (2006.01)

(52) U.S. Cl. ............ 382/218; 382/100; 382/181; 382/209; 382/144; 382/305; 707/100; 358/1.9

(58) Field of Classification Search ............. 382/100, 382/181, 218, 219, 144, 305, 274; 358/1.9; 707/100

See application file for complete search history.

(56) References Cited

U.S. PATENT DOCUMENTS

| | | |
|---|---|---|
| 4,646,352 A | 2/1987 | Asai et al. |
| 5,113,454 A | 5/1992 | Marcantonio et al. |
| 5,200,820 A | 4/1993 | Gharavi |
| 5,303,885 A | 4/1994 | Wade |
| 5,703,968 A * | 12/1997 | Kuwahara et al. ........... 382/269 |
| 5,790,413 A | 8/1998 | Bartusiak et al. |
| 5,825,016 A | 10/1998 | Nagahata et al. |
| 5,867,813 A | 2/1999 | Di Pietro et al. |
| 5,978,027 A | 11/1999 | Takeda |
| 6,094,507 A | 7/2000 | Monden |
| 6,111,984 A | 8/2000 | Fukasawa |
| 6,240,208 B1 | 5/2001 | Garakani et al. |
| 6,260,059 B1 * | 7/2001 | Ueno et al. .................. 709/202 |
| 6,266,676 B1 | 7/2001 | Yoshimura et al. |
| 6,282,317 B1 | 8/2001 | Luo et al. |
| 6,304,298 B1 | 10/2001 | Steinberg et al. |
| 6,389,417 B1 | 5/2002 | Shin et al. |
| 6,480,629 B1 * | 11/2002 | Bakhmutsky ............... 382/236 |
| 6,483,937 B1 * | 11/2002 | Samuels ..................... 382/144 |
| 6,778,699 B1 | 8/2004 | Gallagher |
| 6,934,415 B2 | 8/2005 | Steintiford |
| 7,142,689 B2 * | 11/2006 | Hayashi et al. ............. 382/100 |
| 2001/0013895 A1 | 8/2001 | Aizawa et al. |
| 2001/0030759 A1 * | 10/2001 | Hayashi et al. ............. 358/1.9 |
| 2002/0081033 A1 | 6/2002 | Steintiford |
| 2002/0126891 A1 | 9/2002 | Osberger |
| 2005/0031178 A1 | 2/2005 | Park |
| 2005/0074806 A1 | 4/2005 | Skierczynski et al. |
| 2005/0169535 A1 | 8/2005 | Stentiford |
| 2006/0050993 A1 | 3/2006 | Stentiford |

FOREIGN PATENT DOCUMENTS

| | | |
|---|---|---|
| EP | 0098152 | 1/1984 |
| EP | 1126411 A1 | 8/2001 |
| EP | 1286539 A1 | 2/2003 |
| GB | 1417721 | 12/1975 |
| JP | 3-238533 | 10/1991 |
| JP | 06-245064 | 9/1994 |
| JP | 07-027537 | 1/1995 |
| JP | 2000-512790 | 9/2000 |
| JP | 2002-50066 | 2/2002 |
| WO | WO 82/01434 | 4/1982 |
| WO | WO 90/03012 | 3/1990 |
| WO | WO 99/05639 | 2/1999 |
| WO | WO 99/60517 | 11/1999 |
| WO | WO 00/33569 | 6/2000 |
| WO | WO 01/31638 A1 | 5/2001 |
| WO | WO 01/61648 A2 | 8/2001 |
| WO | WO 02/21446 A1 | 3/2002 |

| | | | |
|---|---|---|---|
| WO | WO 02/098137 A1 | 12/2002 |
| WO | WO 03/081523 A1 | 10/2003 |
| WO | WO 03/081577 A1 | 10/2003 |
| WO | WO 2004/042645 A1 | 5/2004 |
| WO | WO 2004/057493 A2 | 8/2004 |
| WO | WO 2005/057490 A2 | 6/2005 |
| WO | WO 2006/030173 A1 | 3/2006 |

OTHER PUBLICATIONS

International Search Report dated Jun. 12, 2003.
International Search Report dated Mar. 18, 2002.
European Search Report dated Jan. 8, 2003 for RS 018248 GB.
European Search Report dated Jan. 9, 2003 for RS 108249 GB.
European Search Report dated Jan. 9, 2003 for RS 108251 GB.
European Search Report dated Jan. 8, 2003 for RS 108250 GB.
Lutton et al., "Contribution to the Determination of Vanishing Points Using Hough Transform", 1994 IEEE Transactions on Pattern Analysis and Machine Intelligence, vol. 16, No. 4, Apr. 1994, pp. 430-438.
McLean et al., "Vanishing Point Detection by Line Clustering", IEEE Transactions on Pattern Analysis and Machine Intelligence, vol. 17, No. 11, Nov. 1995, pp. 1090-1095.
Koizumi et al., "A New Optical Detector for a High-Speed AF Control", 1996 IEEE, pp. 1055-1061.
Itti et al., "Short Papers: A Model of Saliency-Based Visual Attention for Rapid Scene Analysis", IEEE Transactions on Pattern Analysis and Machine Intelligence, vol. 20, No. 11, Nov. 1998, pp. 1254-1259.
Shufelt, "Performance Evaluation and Analysis of Vanishing Point Detection Techniques", In Analysis and Machine Intelligence, vol. 21, No. 3, Mar. 1999, pp. 282-288.
Wixson, "Detecting Salient Motion by Accumulating Directionally-Consistent Flow", IEEE Transactions on Pattern Analysis and Machine Intelligence, vol. 22, No. 8, Aug. 2000, pp. 774-780.
Privitera et al., "Algorithms for Defining Visual Regions-of-Interest: Comparison with Eye Fixations", IEEE Transactions on Pattern Analysis and Machine Intelligence, vol. 22, No. 9, Sep. 2000, pp. 970-982.
Smeulders et al., "Content-Based Image Retrieval at the End of the Early Years", IEEE Transactions on Pattern Analysis and Machine Intelligence, vol. 22, No. 12, Dec. 2000, pp. 1349-1380.
Vailaya et al., "Image Classification for Content-Based Indexing", IEEE Transactions on Image Processing, vol. 10, No. 1, Jan. 2001, pp. 117-130.
Almansa et al., "Vanishing Point Detection Without Any A Priori Information", IEEE Transactions on Pattern Analysis and Machine Intelligence, vol. 25, No. 4, Apr. 2003, pp. 502-507.
Zhao et al., "Morphology on Detection of Calcifications in Mammograms", 1992 IEEE, pp. III-129-III-132.
Santini et al., "Similarity Matching", Proc $2^{nd}$ Asian Conf on Computer Vision, pp. II 544-548, IEEE, 1995.
Rui et al., "A Relevance Feedback Architecture for Content-Based Multimedia Information Retrieval Systems", 1997 IEEE, pp. 82-89.
Walker et al., "Locating Salient Facial Features Using Image Invariants", Proc. $3^{rd}$ IEEE International Conference on Automatic Face and Gesture Recognition, 1998, pp. 242-247.
Mahlmeister et al., "Sample-guided Progressive Image Coding", Proc. Fourteenth Int. Conference on Pattern Recognition, Aug. 16-20, 1998, pp. 1257-1259, vol. 2.
Osberger et al., "Automatic Identification of Perceptually Important Regions in an Image", Proc. Fourteenth Int. Conference on Pattern Recognition, Aug. 16-20, 1998, pp. 701-704, vol. 1.
Buhmann et al., "Dithered Colour Quantisation", Eurographics 98, Sep. 1998, http://opus.fu-bs.de/opus/volltexte/2004/593/pdf/TR-tubs-cq-1998-01.pdf.
Rui et al., "Relevance Feedback: A Power Tool for Interactive Content-Based Image Retrieval", IEEE Transactions on Circuits and Systems for Video Technology, vol. 8, No. 5, Sep. 1998, pp. 644-655.
Gallet et al., "A Model of the Visual Attention to Speed up Image Analysis", Proceedings of the 1998 IEEE International Conference on Image Processing (ICIP-98), Chicago, Illinois, Oct. 4-7, 1998, IEEE Computer Society, 1998, ISBAN-08186-8821-1, vol. 1, pp. 246-250.
Curtis et al., "Metadata—The Key to Content Management Services", $3^{rd}$ IEEE Metadata Conference, Apr. 6-7, 1999.
Stentiford, "Evolution: The Best Possible Search Algorithm?", BT Technology Journal, vol. 18, No. 1, Jan. 2000, (Movie Version).
Rother, "A New Approach for Vanishing Point Detection in Architectural Environments", $11^{TH}$ British Machine Vision Conference, Bristol, UK, Sep. 2000, http://www.bmva.ac.uk/bmvc/2000/papers/p39.pdf.
Raeth et al., "Finding Events Automatically In Continuously Sampled Data Streams Via Anomaly Detection", Proceedings of the IEEE 2000 National Aerospace and Electronics Conference, NAECON, Oct. 10-12, 2000, pp. 580-587.
Sebastian et al., "Recognition of Shapes by Editing Shock Graphs", Proc. ICCV 2001, pp. 755-762.
Stentiford et al., "Automatic Identification of Regions of Interest with Application to the Quantification of DNA Damage in Cells", Human Vision and Electronic Imaging VII, B.E. Rogowitz, T.N. Pappas, Editors, Proc. SPIE vol. 4662, pp. 244-253, San Jose, Jan. 20-26, 2002.
Xu et al., "Video Summarization and Semantics Editing Tools", Storage and Retrieval for Media Databases, Proc. SPIE, vol. 4315, San Jose, Jan. 21-26, 2001.
Stentiford, "An Estimator for Visual Attention Through Competitive Novelty with Application to Image Compression", Picture Coding Symposium 2001, Apr. 25-27, 2001, Seoul, Korea, pp. 101-104, http://www.ee.ucl.ac.uk/-fstentif/PCS2001-pdf.
Stentiford, "An Evolutionary Programming Approach to the Simulation of Visual Attention", Congress on Evolutionary Computation, Seoul, May 27-30, 2001, pp. 851-858.
Cantoni et al., "Vanishing Point Detection: Representation Analysis and New Approaches", $11^{th}$ Int. Conf. on Image Analysis and Processing, Palermo, Italy, Sep. 26-28, 2001.
Ouerhani et al., "Adaptive Color Image Compression Based on Visual Attention", Proc. $11^{th}$ Int. Conference on Image Analysis and Processing, Sep. 26-28, 2001, pp. 416-421.
Russ et al., "Smart Realisation: Delivering Content Smartly", J. Inst. BT Engineers, vol. 2, Part 4, pp. 12-17, Oct.-Dec. 2001.
Bradley et al., "JPEG 2000 and Region of Interest Coding", Digital Imaging Computing—Techniques and Applications, Melbourne, Australia, Jan. 21-22, 2002.
Roach et al., "Recent Trends in Video Analysis: A Taxonomy of Video Classification Problems", $6^{th}$ IASTED Int. Conf. on Internet and Multimedia Systems and Applications, Hawaii, Aug. 12-14, 2002, pp. 348-353.
Bradley et al., "Visual Attention for Region of Interest Coding in JPEG 2000", Journal of Visual Communication and Image Representation, vol. 14, pp. 232-250, 2003.
Stentiford, "An Attention Based Similarity Measure with Application to Content-Based Information Retrieval", Storage and Retrieval for Media Databases 2003, M.M. Yeung, R.W. Lienhart, C-S Li, Editors Proc SPIE vol. 5021, Jan. 20-24, Santa Clara, 2003.
Stentiford, "The Measurement of the Salience of Targets and Distractors through Competitive Novelty", $26^{th}$ European Conference on Visual Perception, Paris, Sep. 1-5, 2003, (Poster).
Stentiford, "An Attention Based Similarity Measure for Fingerprint Retrieval", Proc. $4^{th}$ European Workshop on Image Analysis for Multimedia Interactive Services, pp. 27-30, London, Apr. 9-11, 2003.
Okabe et al., Object Recognition Based on Photometric Alignment Using RANSAC, Proceedings of the 2003 IEEE Computer Society Conference on Computer Vision and Pattern Recognition (CVPR'03), vol. 2, pp. 221-228, Jun. 19-20, 2003.
Oyekoya et al., "Exploring Human Eye Behaviour Using a Model of Visual Attention", International Conference on Pattern Recognition 2004, Cambridge, Aug. 23-26, 2004, pp. 945-948.
Stentiford, "A Visual Attention Estimator Applied to Image Subject Enhancement and Colour and Grey Level Compression", International Conference on Pattern Recognition 2004, Cambridge, Aug. 23-26, 2004, pp. 638-641.
Rasmussen, "Texture-Based Vanishing Point Voting for Road Shape Estimation", British Machine Vision Conference, Kingston, UK, Sep. 2004, http://www.bmva.ac.uk/bmvc/2004/papers/paper_261.pdf.

Finlayson et al., "Illuminant and Device Invariant Colour Using Histogram Equalisation", Pattern Recognition, vol. 38, No. 2 (Feb. 2005), pp. 179-190.
Stentiford, "Attention Based Facial Symmetry Detection", International Conference on Advances in Pattern Recognition, Bath, UK, Aug. 22-25, 2005.
Stentiford, "Attention Based Symmetry Detection in Colour Images", IEEE International Workshop on Multimedia Signal Processing, Shanghai, China, Oct. 30-Nov. 2, 2005.
Wang et al., "Efficient Method for Multiscale Small Target Detection from a Natural Scene", 1996 Society of Photo-Optical Instrumentation Engineers, Mar. 1996, pp. 761-768.
Rohwer et al., "The Theoretical and Experimental Status of the n-Tuple Classifier", Neural Networks, vol. 11, No. 1, pp. 1-14, 1998.
Brown, A Survey of Image Registration Techniques, ACM Computing Surveys, vol. 24, No. 4, Dec. 1992, pp. 325-376.
Zhao et al., "Face Recognition: A Literature Survey", CVLK Technical Report, University of Maryland, Oct. 2000, ftp://ftp.cfar.umd.edu/TRs/CVL-Reports-2000/TR4167-zhao.ps.qz.
Stentiford et al., "An Evolutionary Approach to the Concept of Randomness", The Computer Journal, pp. 148-151, Mar. 1972.
International Search Report mailed Feb. 9, 2006 in International Application No. PCT/GB2005/003339.
Chang et al., "Fast Algorithm for Point Pattern Matching: Invariant to Translations, Rotations and Scale Changes", Pattern Recognition, vol. 30, No. 2, Feb. 1997, pp. 311-320.

* cited by examiner

*Primary Examiner*—Matthew C Bella
*Assistant Examiner*—Ali Bayat
(74) *Attorney, Agent, or Firm*—Nixon & Vanderhye PC

(57) ABSTRACT

A first image (or other pattern) is represented by a first ordered set of elements A each having a value and a second pattern is represented by a second such set. A comparison of the two involves performing, for each of a plurality of elements x of the first ordered set the steps of selecting from the first ordered set a plurality of elements x' in the vicinity of the element x under consideration, selecting an element y of the second ordered set and comparing the elements x' of the first ordered set with elements y' of the second ordered set (each of which has the same position relative to the selected element y' of the second ordered set as a respective one x' of the selected plurality of elements of the first ordered set has relative to the element x under consideration). The comparison itself comprises comparing the value of each of the selected plurality of elements x' of the first set with the value of the correspondingly positioned element y' of the like plurality of elements of the second set in accordance with a predetermined match criterion to produce a decision that the plurality of elements of the first ordered set matches the plurality of elements of the second ordered set. The comparison is them repeated with a fresh selection of the plurality of elements x' of the first set and/or a fresh selection of an element y of the second ordered set generating a similarity measure V as a function of the number of matches. Preferably, following a comparison resulting in a match decision, the next comparison is performed with a fresh selection of the plurality of elements x' of the first set and the same selection of an element y of the second set.

10 Claims, 9 Drawing Sheets

US 7,570,815 B2

COMPARING PATTERNS

This application is the U.S. national phase of international application PCT/GB03/01209 filed 21 Mar. 2003 which designated the U.S. and claims benefit of EP 02252097.7, dated 22 Mar. 2002, the entire content of which is hereby incorporated by reference.

BACKGROUND

1. Technical Field

The present invention is concerned with comparing one pattern with another, and is of particular interest in the comparison of two-dimensional patterns such as visual images, although applicable also to one-dimensional patterns and patterns having three or more dimensions.

2. Related Art

Standard approaches to pattern recognition use templates to recognize and categorize patterns [1]. Such templates take many forms, but they are normally produced by a statistical analysis of training data and matched with unseen data using a similarity measure [2]. The statistical analysis is normally carried out over a number of intuitively selected features that appear to satisfy the needs of the recognition task. For example, in speech recognition, templates can be encapsulated as Hidden Markov Models derived in the frequency domain and, in Optical Character Recognition, the templates take the form of the character fonts themselves. In the case of face recognition, a number of intuitively chosen features such as skin texture, skin color and facial feature registration are used to define face templates. In a CCTV surveillance application, intruders are normally detected through a process of frame subtraction and background template modelling which detects movement and removes background effects from the processing [3]. In many cases, the number of features leads to a computationally unmanageable process and Principal Components Analysis and other techniques are used to scale down the problem without significantly reducing performance (e.g., see partek.com website/index.html). These approaches achieve great success in non-noisy environments, but fail when the pattern variability and number of pattern classes increase.

Some techniques for analysis of images or other patterns where the pattern is compared with other parts of the same pattern are described in our earlier patent applications as follows.

European patent application 00301262.2 (publication No. 1126411);

International patent application PCT/GB01/00504 (publication No. WO 01/61648);

International patent application PCT/GB01/03802 (publication No. WO 02/21446);

U.S. patent application Ser. No. 977,263/09 filed 16 Oct. 2001 (publication No. 20020081033);

as well as the following papers published by the inventor:
Stentiford F W M, "An estimator for visual attention through competitive novelty with application to image compression", Proc. Picture Coding Symposium 2001, Seoul, 25-27 April, pp 101-104, 2001.
Stentiford F W M, "An evolutionary programming approach to the simulation of visual attention", Proc. Congress on Evolutionary Computation 2001, Seoul, pp 851-858, 27-30 May, 2001.

SUMMARY

According to one aspect of the present invention there is provided a method of comparing a first pattern represented by a first ordered set of elements each having a value with a second pattern represented by a second ordered set of element each having a value, comprising performing, for each of a plurality of elements of the first ordered set the steps of:

(i) selecting from the first ordered set a plurality of elements in the vicinity of the element under consideration, the selected elements having, within the ordered set, respective mutually different positions relative to the element under consideration;

(ii) selecting an element of the second ordered set;

(iii) comparing the selected plurality of elements of the first ordered set with a like plurality of elements of the second ordered set each of which has within the second ordered set the same position relative to the selected element of the second ordered set as a respective one of the selected plurality of elements of the first ordered set has relative to the element under consideration, said comparison comprising comparing the value of each of the selected plurality of elements of the first ordered set with the value of the correspondingly positioned element of the like plurality of elements of the second ordered set in accordance with a predetermined match criterion to produce a decision that the plurality of elements of the first ordered set matches the plurality of elements of the second ordered set;

(iv) repeating said comparison with a fresh selection of the plurality of elements of the first ordered set and/or a fresh selection of an element of the second ordered set; and (v) generating for the element under consideration a similarity measure as a function of the number of comparisons for which the comparison indicates a match.

Other aspects of the invention are defined in the claims.

BRIEF DESCRIPTION OF THE DRAWINGS

Some embodiments of the present invention will now be described with reference to the accompanying drawings, in which:

FIG. 1 shows an apparatus consisting of a general purpose computer programmed to perform image analysis according to a first embodiment of the invention. It has a bus 1, to which are connected a central processing unit 2, a visual display 3, a keyboard 4, a scanner 5 (or other device, not shown) for input of images, and a memory 6.

DETAILED DESCRIPTION OF EXEMPLARY EMBODIMENTS

In the memory 6 are stored an operating system 601, a program 602 for performing the image analysis, and storage areas 603, 604 for storing two images, referred to as image A and image B. Each image is stored as a two-dimensional array of values, each value representing the brightness of a picture element within the array.

Figure 1:
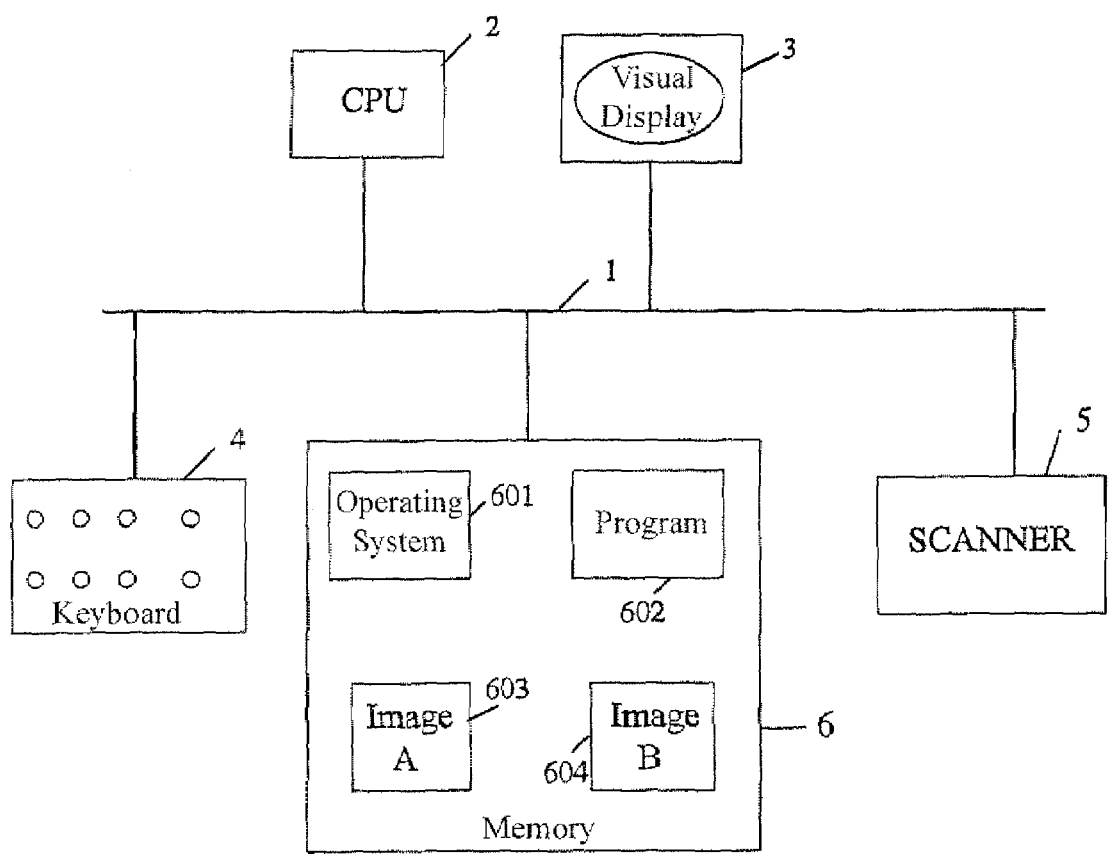
FIG. 1 is a block diagram of an apparatus for performing the invention.
Figure 2B:
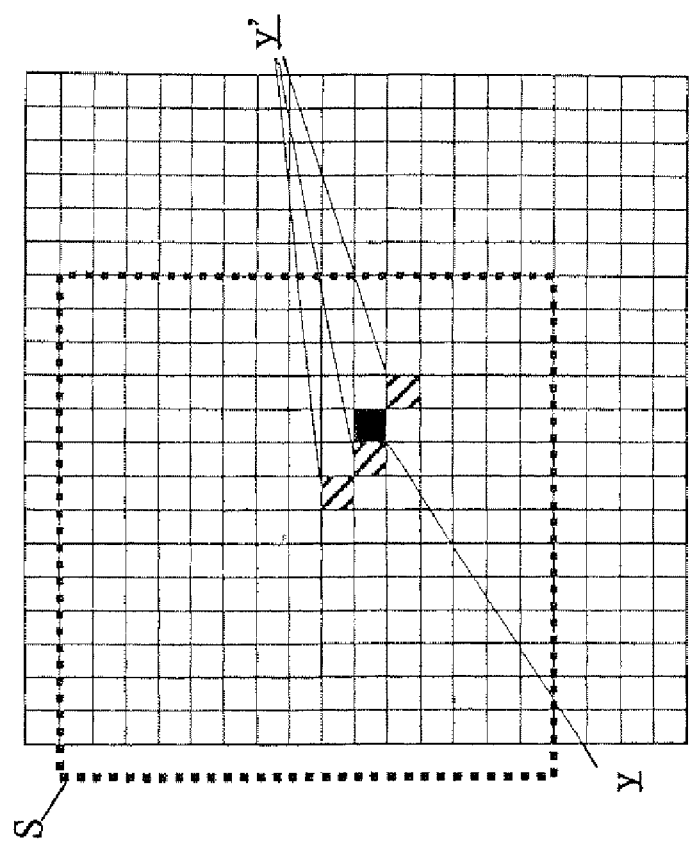
FIG. 2 is a diagram illustrating operation of the invention.
Figure 2A:
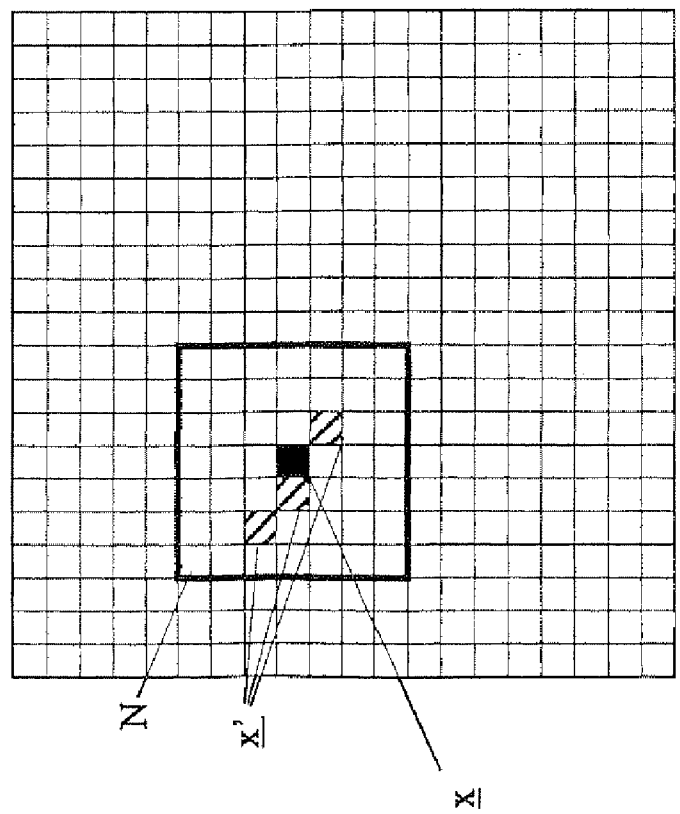

The image arrays are shown schematically in FIGS. 2a and 2b. Image A consists of a 20×20 array of picture elements $\underline{x}=(x_1, x_2)$ where $x_1$ and $x_2$ are the horizontal and vertical positions of the elements within the image. Each element has a brightness represented by a respective value $a=a(\underline{x})$. Similarly, the image B consists of a 20×20 array of picture elements $\underline{y}=(y_1, y_2)$ having brightness values b.

Figure 3:
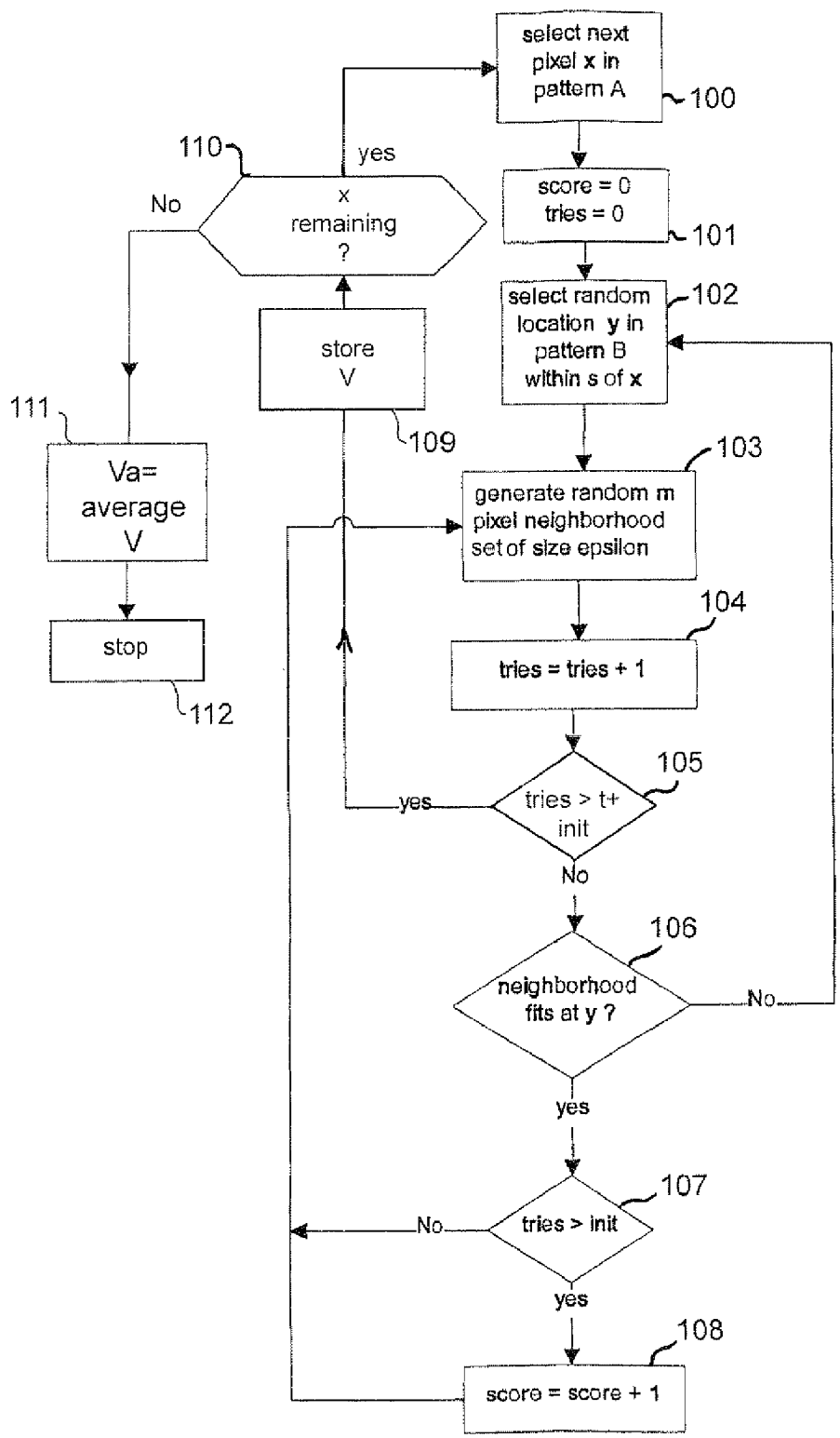
FIG. 3 is a flowchart of the steps to be performed by the apparatus of FIG. 1 in accordance with one embodiment of the invention.

A method of image analysis performed by the program 602 is performed in accordance with the flowchart shown in FIG. 3. It has as its aim to generate a measure V of similarity between the images; more specifically, a high value of V indicates that image B contains visual material similar to the content of image A.

It is assumed that the images have width $xmax_1$ and $ymax_1$ and height $xmax_2$ and $ymax_2$, and the picture element co-ordinates are $x_1=0 \ldots xmax_1-1, x_2=0 \ldots xmax_2-1$.

In Step 100, a picture element $\underline{x}$ in image A is selected. They can be dealt with in any order, but it is convenient to select initially the element $\underline{x}=(\epsilon,\epsilon)$ and on subsequent iterations, successive elements in raster-scan fashion, until all have been dealt with, except for those within $\epsilon$ of the edge of the image i.e. up to $(xmax_1-\epsilon-1, xmax_2-\epsilon-1)$.

In Step 101, the score V and a counter tries are set to zero.

In Step 102, an element $\underline{y}=(y_1, y_2)$ is chosen at random from image B, within a maximum distance s of the position of $\underline{x}$, that is $$|x_i - y_i| \leq s \text{ for all } i$$

This limitation, which is optional, is represented in FIG. 2b by the dotted square S. It improves efficiency if it is known that corresponding objects in the two images will not be shifted in position by more than s picture elements in either co-ordinate direction: in effect, s represents the maximum misregistration or local distortion between the two images.

The selection of $\underline{y}$ is also subject to the restriction that it is located no more than $\epsilon$ from the edge of the image, i.e.

$$\epsilon \leq y_i \leq ymax_i - \epsilon - 1 \text{ for } i=1,2$$

where $ymax_i$ is the width or height of the image in picture elements (20 in this example).

In Step 103, a set $S_x$ of picture elements $\underline{x}'$, are selected, comparing the element plus at least one further element, m in number, randomly selected from image A, in the neighbourhood N of picture element $\underline{x}$, where the neighbourhood N is a $2\epsilon+1 \times 2\epsilon+1$ square centred on $\underline{x}$. That is, an element $\underline{x}'=(x_1', x_2')$ lies within N if $$|x_i' - x_i| < \epsilon \text{ for all } i$$

We prefer that the neighbourhood set $S_x$ includes the element $\underline{x}$ itself, although this is not actually essential. A neighbourhood set $S_y$ is then defined in image B, with m+1 elements $\underline{y}'=(y_1', y_2')$ each of which has the same position relative to element $\underline{y}$ as the corresponding element $\underline{x}'$ of $S_x$ has from $\underline{x}$, that is $$y_i' - y_i = x_i' - x_i \text{ for all } i$$

(The reason for the edge restrictions mentioned above is of course to avoid choosing a neighbourhood which extends outside the image area). In Step 104, the counter tries is incremented, and in Step 105 its value is checked so see whether sufficient comparisons have been performed.

Assuming for the present that this is not the case, then at Step 106 the two sets $S_x$, $S_y$ are compared. If the difference between the value of an element $\underline{x}'$ of the set $S_x$ and the value of the correspondingly positioned element $\underline{x}'$ of the set $S_y$ is less than a threshold $\delta$, i.e.

$$|a(\underline{x}') - b(\underline{y}')| < \delta$$

then the two elements are considered to match. The two sets are considered to match only if every element $\underline{x}'$ of the set $S_x$ matches the corresponding element $\underline{y}'$ of the set $S_y$.

If the sets do not match, the element $\underline{y}$ is discarded as a candidate for further comparisons and the process resumes at step 102 with a fresh point $\underline{y}$ being chosen. If on the other hand, they match, then $\underline{y}$ is retained for a further iteration. Ignoring Step 107, for the present, the process proceeds with step 108 where the score V is incremented. Different neighbourhood sets are then generated at Step 103 and the process repeated from that point.

When, at Step 105, the count tries of the number of comparisons exceeds a threshold, the process for the current $\underline{x}$ is terminated: at Step 109 the value of V is stored in the memory 6 and then, at step 110, a check is performed as to whether all points $\underline{x}$ have been dealt with. If so, then firstly the average score Va (being the average of all the individual scores V for the picture elements $\underline{x}$ in image A) is calculated at Step 111 and the process terminated at 112; otherwise the whole process is repeated from Step 100 for a fresh point $\underline{x}$.

The threshold value used at Step 105 could be set to a desired number of comparisons t, and Step 107 omitted. In practice, however, we find that the early comparisons often do not find a match, but once a match is found a significant number of different neighbourhood sets show matches with the same $\underline{y}$. In the interests of providing a score V which is easily interpreted, the first few iterations are not scored; the process as shown includes a test 107 which prevents the score being incremented during the first init comparisons. The threshold used at Step 105 is thus increased by init so that the maximum potential score is t. In this way, we find that the chances of obtaining a high or maximum score for images which are very similar or identical is greatly increased.

Specific values for the various parameter used in tests were as follows:

Image A size $xmax_1 \times xmax_2$: 20×20
Image B size $xmax_1 \times xmax_2$: 20×20
Neighbourhood parameter $\epsilon$: 4
Neighbourhood set size m: 3
Maximum A–B shift s: 7
Number of comparisons t: 50
Initial comparisons init: 20

Naturally, for higher definition images, correspondingly larger values of $\epsilon$ and s would be chosen. The values of t and init have to be increased as s increases in order to obtain equally reliable and statistically significant results.

The results of these tests are given later; where the parameters used differ from those quoted above, this is noted.

It will be seen that the score of a picture element $\underline{x}$ in the pattern A is high if many randomly selected $S_x$ match $S_y$ for a given $\underline{y}$ in pattern B. It is worth noting that the Visual Attention score (discussed in our earlier patent applications) of picture element $\underline{x}$ in pattern A is high if $S_x$ mis-matches $S_y$, where $\underline{y}$ is not held but is randomly selected from pattern A. Whereas Visual Attention requires no memory save the single image A, the present method requires also the information contained in pattern B to detect commonality.

A location $\underline{x}$ will be worthy of cognitive attention if a sequence of t neighbourhood sets $S_x$ matches a high proportion of the same neighbourhoods surrounding some $\underline{y}$ in pattern B. In FIG. 2, m=3 picture elements $\underline{x}'$ are selected in the neighbourhood of a picture element $\underline{x}$ in pattern A and matched with 3 picture elements in the neighbourhood of picture element $\underline{y}$ in pattern B. Each of the picture elements might possess three colour intensities, so $\underline{a}=(a_r, a_g, a_b)$ and the neighbourhood set of the second picture element $\underline{y}$ matches the first if the colour intensities of all m +1 corresponding picture element have values within $\delta$ of each other. Picture elements $\underline{x}$ in A that achieve large numbers of matches over a range of t neighbourhood sets $S_x$ with neighbourhood sets $S_y$ around y in B are assigned a high score. This means that neighbourhood sets in A possessing structure present in B will be assigned high scores.

Some image analysis techniques carry out comparison calculations between images using patches that are neighbourhoods in which all the picture elements are employed. Patches match when a measure of correlation exceeds a certain threshold. This approach is unable to make best use of detail that is smaller than the size of the patch except in the case in which the correlation measure is designed to identify a specific texture. The random picture element neighbourhoods $S_x$ used in this method do not suffer from this disadvantage.

The gain of the scoring mechanism is increased significantly by retaining the picture element location y if a match is detected, and re-using y for comparison with the next of the t neighbourhood sets. It is likely that if a matching picture element configuration is generated, other configurations will match again at the same point, and this location y once found and re-used, will accelerate the rise of the score provided that the sequence is not subsequently interrupted by a mismatch.

If, however, $S_x$ subsequently mis-matches at that location, the score is not incremented, and an entirely new location y in pattern B is randomly selected ready for the next comparison. In this way competing locations in pattern B are selected against if they contain little commonality with the neighbourhood of x in pattern A.

Some possible variations will now be discussed.

a) It is not essential that all picture elements x be analysed: thus, if desired, a subset—perhaps on a regular grid—could be chosen.

b) The above method assumes single (brightness) values for the picture elements. In the case of colour images, the images could firstly be converted to monochrome. Alternatively, if each picture element is expressed as three values, such as red, green and blue, or luminance plus colour difference, then the test for a match would involve consideration of the distance between the element values in 3 dimensions. For example, if the colour component values are $\underline{a}=(a_r, a_g, a_b)$, $\underline{b}=(b_r, b_g, b_b)$ for the two image then the criterion for a match might be $(a_r-b_r)<\delta$ and $|a_g-b_g|<\delta$ and $|a_b-b_b|<\delta$. See below for further discussion of distance measures.

c) The strategy of choosing y at random could be modified by providing that when a element $\underline{x}=(x_1, x_2)$ produces a high score V against element y, and an adjacent element x (e.g. $(x_1+1, x_2)$) is to be dealt with, then the first element y to be selected in image B could be the correspondingly adjacent element (i.e. $(y_1+1, y_2)$). Further selections of y would be random, as before. In the event that the high score for element x was produced as a result of comparisons with more than one y, then one would choose the element adjacent to whichever y made the largest contribution to the high score. To implement this is would be necessary to track, temporarily, the coordinates of the different picture elements y and their partial scores.

d) The process need not necessarily be carried out for the whole image. For example, if a region of image A has been identified as being of special interest—perhaps using the method described in one of our earlier patent applications referred to above—then the picture elements x dealt with may be just those lying within the identified region.

References here to random selection include the possibility of selection using a pseudo-random process.

The method is not applicable solely to images, or even three-dimensional patterns, but can be used for any ordered set of values in 1, 2, 3 or more dimensions.

More generally, suppose that one wishes to generate a measure of the similarity between two patterns A and B, where both the patterns and the individual pattern of values within a pattern may have 1, 2 or more dimensions.

Let a set of measurements $\underline{a}$ on pattern A correspond to a location $\underline{x}$ in A in bounded n-space $(x_1, x_2, x_3, \ldots, x_n)$ where $$\underline{x}=(x_1,x_2,x_3,\ldots,x_n) \text{ and } \underline{a}=(a_1,a_2,a_3,\ldots,a_p)$$

Define a function $\underline{F}$ such that $\underline{a}=\underline{F}(\underline{x})$ wherever $\underline{a}$ exists. It is important to note that no assumptions are made about the nature of $\underline{F}$ e.g. continuity. It is assumed that $\underline{x}$ exists if $\underline{a}$ exists.

Consider a neighbourhood N of $\underline{x}$ where $$\{\underline{x}' \in N \text{ iff} |x_i - x'_i| < \epsilon_i \, \forall i\}$$

Select a set of m+1 random points $S_x$ in N where $$S_x = \{\underline{x}'_1, \underline{x}'_2, \underline{x}'_3, \ldots, \underline{x}'_m\} \text{ and } \underline{F}(\underline{x}'_i) \text{ is defined.}$$

where however one of the $\underline{x}'$ is preferably constrained to equal $\underline{x}$. It is not found in practice to be necessary to constrain the random selection to avoid selection of the same point twice: i.e. the $\underline{x}'_i$ need not be distinct. Indeed, the $\underline{x}'_i$ could all be coincident with $\underline{x}$ or $\underline{x}'_1$.

Select a location $\underline{y}$ corresponding to the set of measurements $\underline{b}$ on pattern B for which $\underline{F}$ is defined.

Define the set $S_y = \{\underline{y}'_1, \underline{y}'_2, \underline{y}'_3, \ldots, \underline{y}'_m\}$ where $$\underline{x} - \underline{x}'_i = \underline{y} - \underline{y}'_i \text{ and } \underline{F}(\underline{y}'_i) \text{ exists.}$$

The neighbourhood set $S_x$ of $\underline{x}$ is said to match that of $\underline{y}$ if $$|F_j(\underline{x}) - F_j(\underline{y})| < \delta_j \text{ and } |F_j(\underline{x}'_i) - F_j(\underline{y}'_i)| < \delta_j \, \forall i,j.$$

In general $\delta_j$ is not a constant and will be dependent upon the measurements under comparison i.e.

$$\delta_j = f_j(\underline{F}(\underline{x}), \underline{F}(\underline{y})) \, j=1 \ldots p$$

Note that for some problems rather than defining a match as requiring the individual components $a_j = F_j(\ )$ and $b_j = F_j(\ )$ to match one might prefer to apply a threshold to the vector distance between $\underline{a}$ and $\underline{b}$ such as the city block distance.

$$\sum_j |a_j - b_j|$$

or the Euclidean distance $$\sqrt{\left\{\sum_j (a_j - b_j)^2\right\}}$$

The operation of the method described in the flowchart of FIG. 3 will be illustrated by the following test results.

In the tests, 20×20 black and white images were used (i.e. the values of a and b were always either 0 or 1). The tests however differ from the earlier description in that only black picture elements are scored—that is, the match criterion is not merely that $|a-b|<\delta$ but that $a=b=1$.

In each case the accompanying Figure shows a first image A, plus several second images B with which the first was compared, marked B1, B2 etc. (in once case two first images A1, A2 are compared with one image B). The coordinates $x_1$, $y_1$ 30 are measured from left to right and the coordinates $x_2$, $y_2$ from top to bottom. Each of the second images is marked with the average score Va. Some Figures show a three-dimensional plot of the individual scores V over the image area: in each case the right-hand axis represents the horizontal axis of the mark and the front axis represents the vertical axis of the image. The vertical axis of the plot represents the value of V (in the embedded recognition case of Example 2, and 50−V in the other cases).

Example 1

Figure 4:
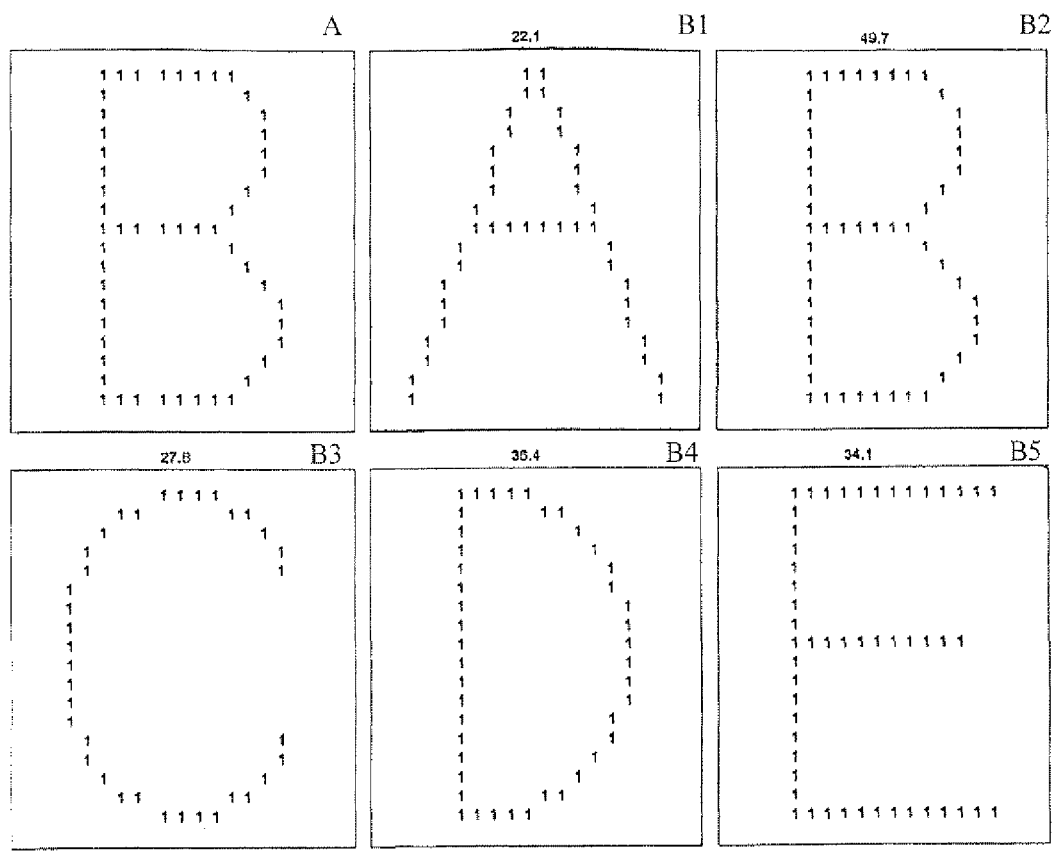
FIGS. 4 to 9 illustrate some images and numerical results obtained for them

Optical Character Recognition (FIG. 4)

An image A of the letter B is compared with images B1-B5, of the letters A, B, C, D and E. The rank ordered average scores Va correspond to B, D, E, C, A. The results were generated with t=50, s=3 and $\epsilon$=2.

Example 2

Figure 5:
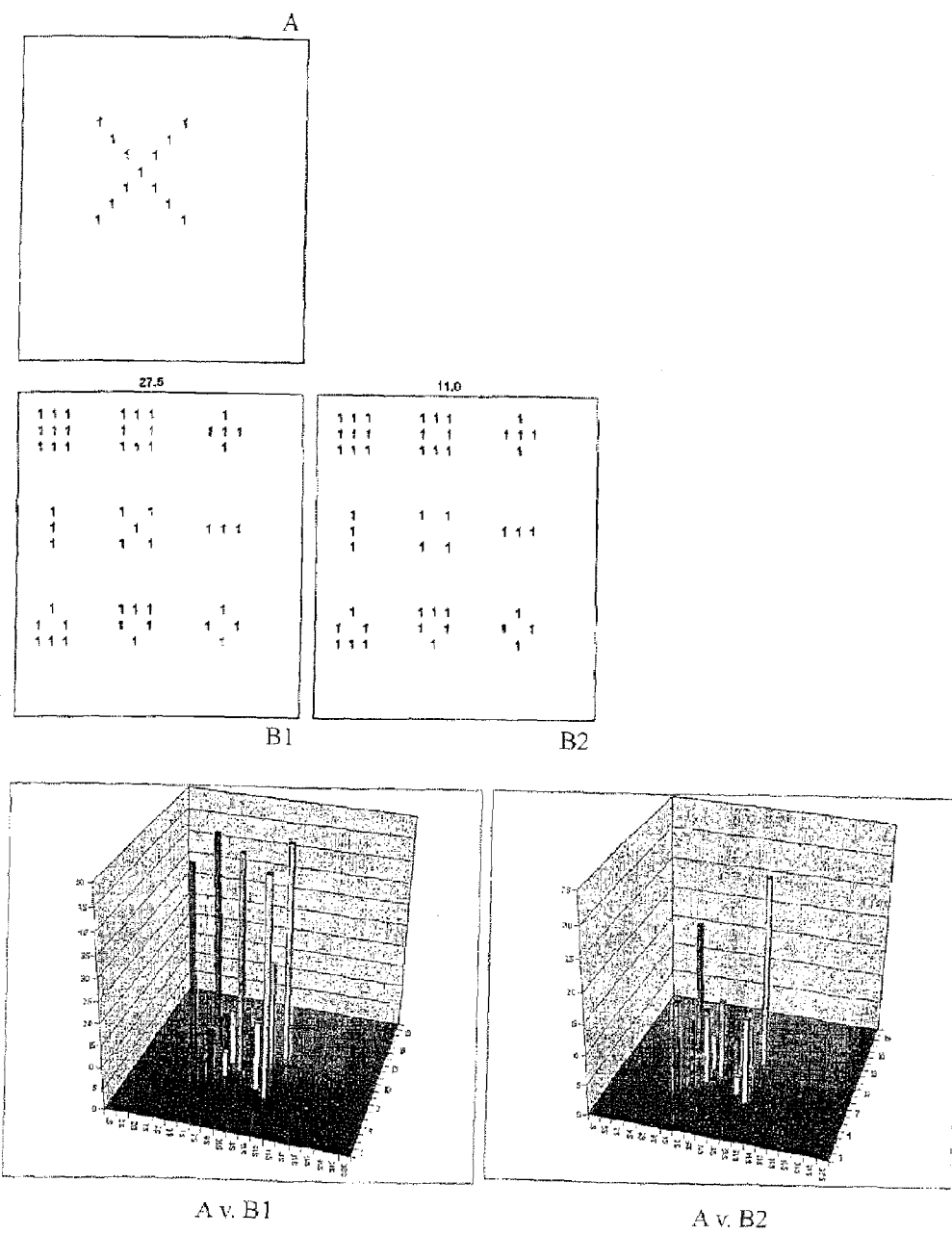

Embedded Recognition (FIG. 5)

An image A of an 'X' shape is compared with another image B1 containing 9 smaller shapes including an 'X'. The 'X' shape is again compared with image B2 with the same 9 shapes except for the small 'X' which is altered. The average scores $V_a$ are 27.5 and 11.9 respectively, indicating the presence of 'X' features in the first and less in the second. The individual scores V for the respective comparisons are shown in the charts. The results were generated with t=50, s=7 and $\epsilon$=2. A more complicated example of embedded recognition is the identification of known faces in a crowd of people.

Example 3

Figure 6:
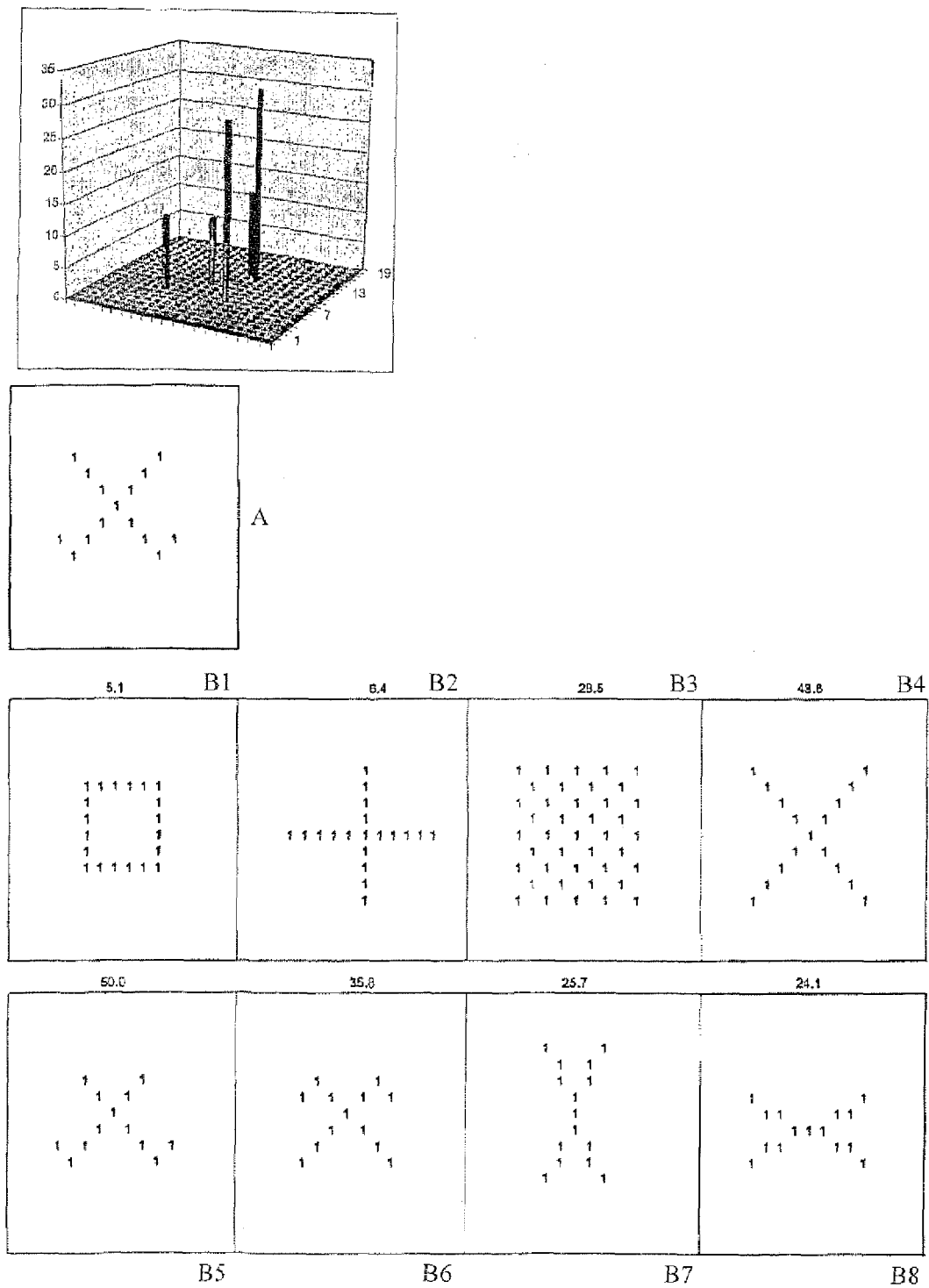

Trade Mark Retrieval (FIG. 6)

An image A of a special cross shape is first compared with 4 basic shapes B1-B4 including a large cross, each basic pattern representing clusters of similar shapes with high scores between each other. The large cross generates the largest average score $V_a$ (43.6). The same special cross in then compared with 4 varieties of cross B5-B8 including a small version of itself (B5) which obtains a maximum score of 50. The chart provides the values of (50−V) for each picture element in the comparison with the large cross—the tall columns indicate the disparity with the ends of the lower legs of the cross. The results were generated with t=50, s=7 and $\epsilon$=2.

Example 4

Figure 7:
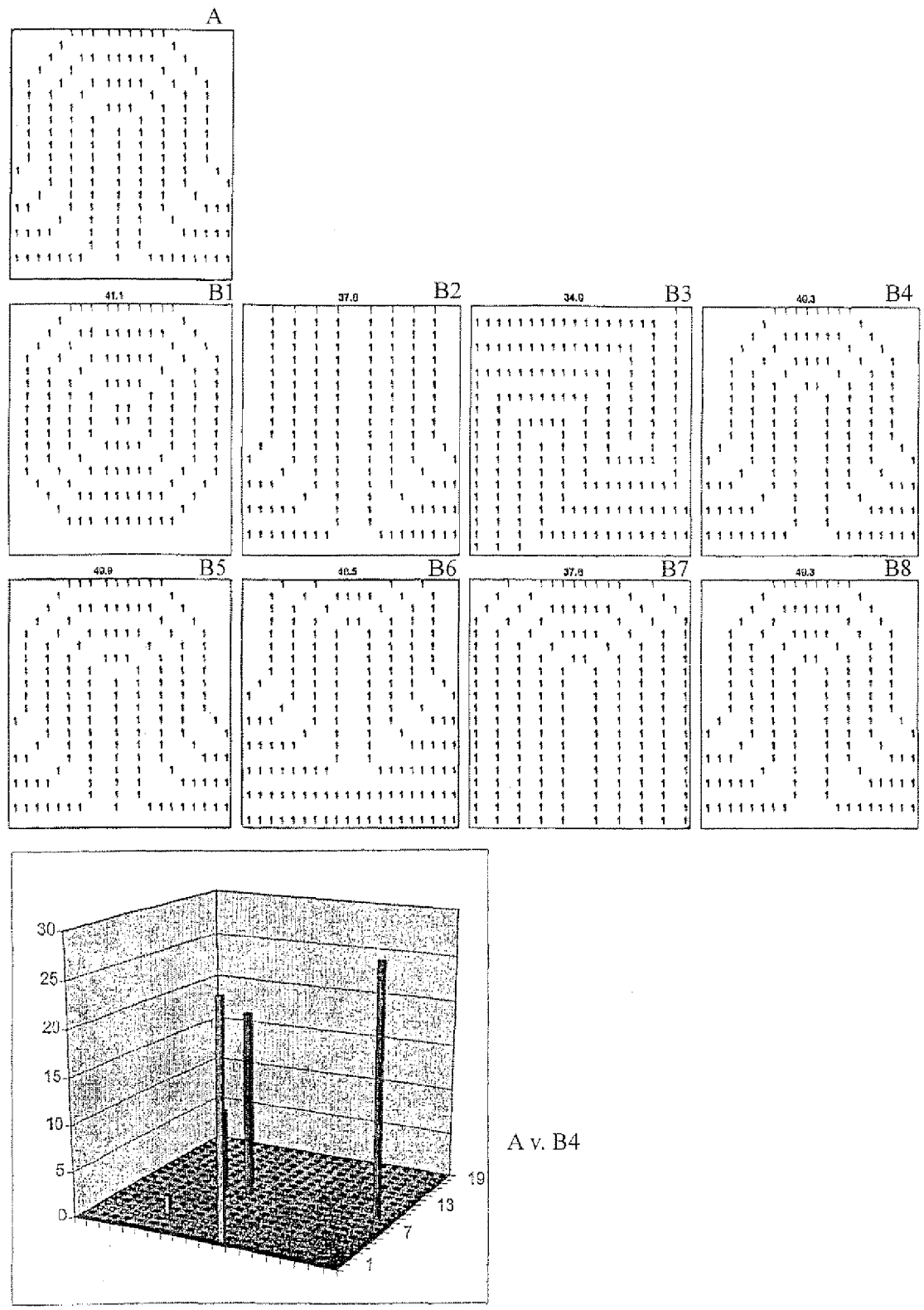

Fingerprint Recognition (FIG. 7)

More complex patterns, some possessing a great deal of similar material, are able to be distinguished and retrieved as in the trade mark example. A simplified arch A matches best with a representative arch B4 (49.3), and then with an identical pattern (49.9) amongst other arches. The chart provides the values of (50−V) for each picture element in the comparison with the representative arch pattern—the tall columns indicate the disparity with the ridge ends and on the border. The results were generated with t=50, s=3 and $\epsilon$=2.

Example 5

Figure 8:
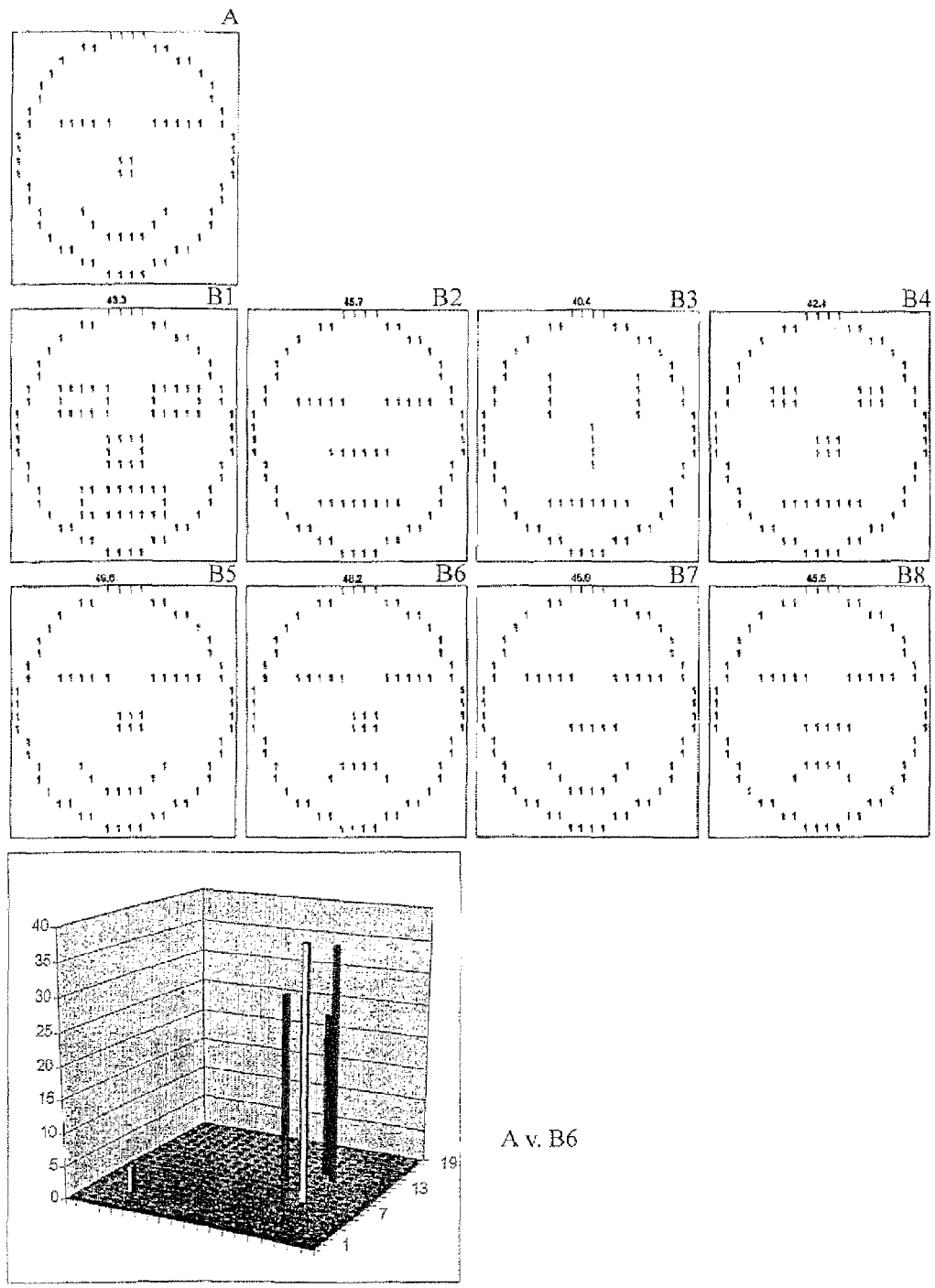

Face Recognition (FIG. 8)

Although the data is extremely simplified, this example illustrates an implementation of face recognition. A face A is matched with 4 representative faces B1-B4 and then with 4 faces in a sub-cluster B5-B8 represented by the best fitting representative face B2 (45.7). The best fit is with a non-identical face B7 in the sub-cluster (49.6). The chart provides the values of (50−V) for each picture element in the comparison with the $2^{nd}$ closest pattern B6 (48.2)—the tall columns indicate the disparity in the mouth region. The results were generated with t=50, s=3 and $\epsilon$=2.

Example 6

Figure 9:
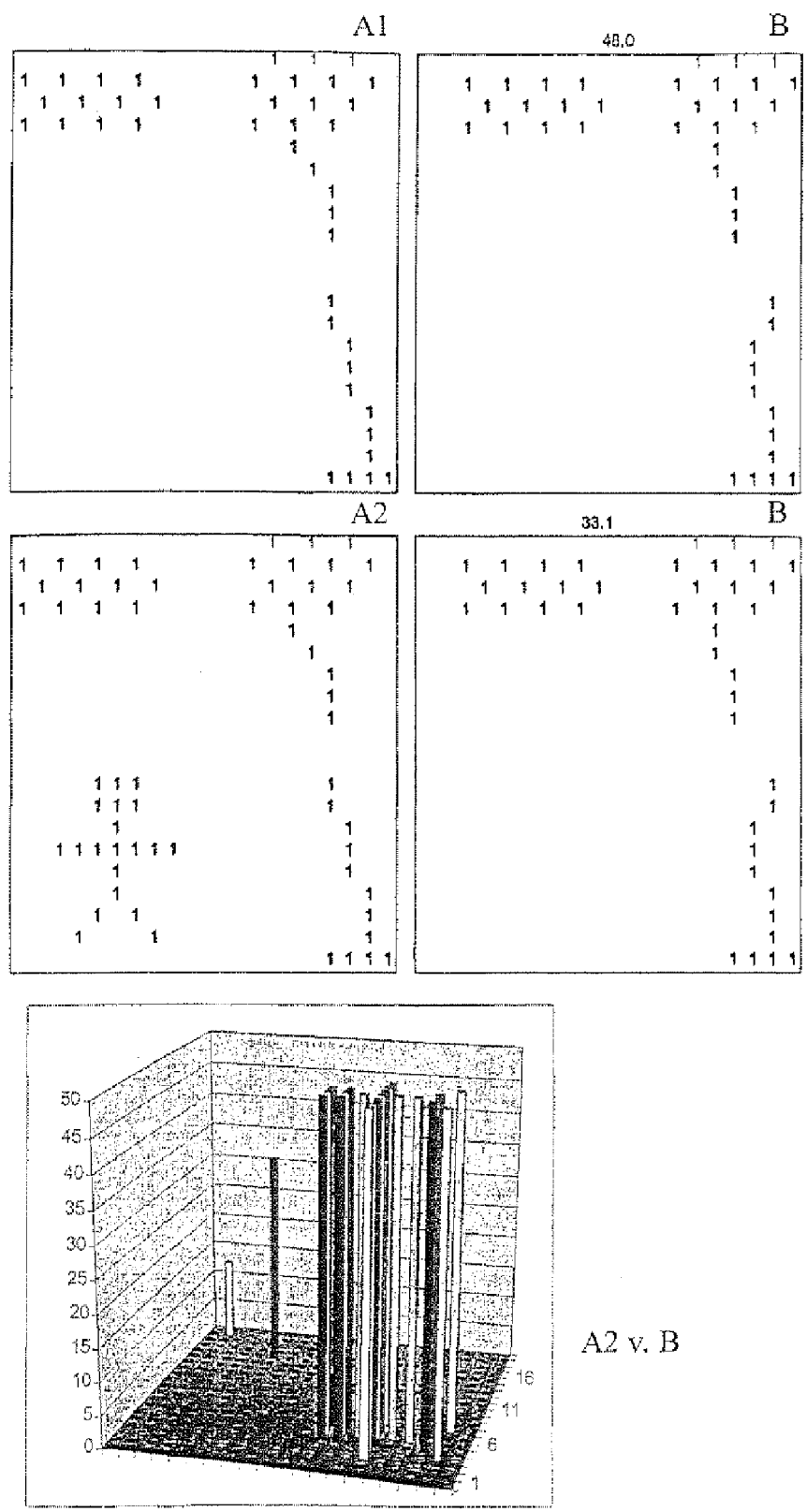

Surveillance (FIG. 9)

This example illustrates how intruders might be detected against a variable background. A pattern A1 representing a moving cloud, tree and fence obtains a high average score $V_a$ (48.0) against a standard background B, but a version (A2) with an intruder present obtains a much lower score (33.1). The chart provides the values of (50−V) for each picture element in the intruder image (33.1)—the tallest columns indicate the location of the intruder. The results were generated with t=50, s=3 and $\epsilon$=2.

This method carries out an analysis of two images that identifies perceptually significant common features and differences without being affected by scale differences, and by local relative distortions and translations. This means that it can be applied to recognition problems in which the object to be recognised is embedded in another image. It also means that images may be categorised according to the measure of feature similarity with each other and these values used to define a multi-class recognition system and a Query By Example retrieval system. By the same token the method may be used to detect dissimilarities as in the case of intruder detection or forgery detection. It may be used to detect disparities between images to detect motion or parallax. It does not necessarily rely upon prior knowledge of the content of the images and no training process is necessary. The algorithm is eminently suitable for parallel implementation.

Various advantages of the methods we have described will now be discussed.

Pattern Recognition

Standard approaches to pattern recognition require large numbers of representative patterns from all classes in order to satisfy the requirements of the training process for the classifier. Such classifiers will still fail if the features selected do not characterise unseen patterns not represented properly in the training set. This method requires no training set, save the two images under comparison.

It is normal for pattern recognition techniques to make special provision for scale differences between the patterns being classified. Such differences in the visual domain can arise because of perspective and other factors and it is common for prior knowledge to be incorporated in the classifier to compensate. This is not necessary in this method, provided that $\epsilon$ is not too large.

Another advantage is the ability to identify patterns embedded within larger data structures without suffering from exponentially growing computational demands or the effects of noise. This method therefore has application to the problem of detecting copyright infringement where portions of material have been cropped from larger works (of art, for example), and the task of reducing the size of databases where it is known that duplication is prevalent. It also has direct application to the problem of identifying scene-of-crime fingerprints where only a part of the total print is available for matching. In the case of facial recognition the method lends itself to searches based upon restricted portions of the unknown face. This means, for example, that searches can be carried out purely on the basis of the eye and nose region in cases where beards and moustaches might lead to ambiguity.

Unless provision is made for specific pattern content, the standard template approaches to pattern recognition fail when the patterns under comparison differ because of local distortions or small movements, as would be the visual case with rustling trees, moving clouds, changes in facial expression, scene-of-crime fingerprints on irregular surfaces, or noise, for example. Such provision requires prior knowledge of the application and will still cause the system to fail if the unseen pattern distortions do not conform to the system design requirements. This method is able to ignore the effects of local distortions without prior knowledge of the type of distortion.

The method may be applied to patterns of any dimension, such as one-dimensional audio signals, three dimensional video data (x,y,time), or n-dimensional time dependent vectors derived from any source such as sensor arrays. In the case of speech recognition it is able to handle variations in the speed of the speech without the use of special heuristics. A conventional approach uses Dynamic Time Warping to overcome this problem, but invokes greater computational effort and the danger of the warping process leading to increased misclassifications especially in a large multi-class problem. Furthermore portions of utterances would be sufficient for word identification using this invention if they were unique in the domain of discourse (e.g. 'yeah' instead of 'yes', missing the final sibilant).

This method deals with these problems by measuring the score of neighbourhoods in each image. Whereas a picture element is important within a single image if its neighbourhood is significantly different from most other parts of the same image (as discussed in our earlier patent applications mentioned above), it is cognitively important if its neighbourhood is significantly similar to that in a neighbourhood in the second image. The effects of mis-registration and local distortions are considerably reduced as the scores are not affected within certain limits.

The scores can be used to cluster groups of patterns possessing high scores relative to each other. Representative patterns taken from each cluster may themselves be clustered to form super-clusters and the process continued to structure very large pattern databases. Query-By-Example retrieval can be carried out by measuring the scores to each of the top level representative patterns and then to each of the representative patterns in sub-clusters corresponding to the highest scoring representative pattern in the previous cluster. It is likely that some representative patterns will represent overlapping clusters containing patterns which happen to possess high scores with those representative patterns. The method may be used in combination with a visual attention mechanism to rapidly define an area of interest in the pattern and then derive scores between this restricted area and a set of reference patterns (B patterns). In an aviation context a flying object might be quickly detected using visual attention and subsequently computed scores would reveal whether the object was likely to be a bird or a plane.

Disparity Detection

Standard approaches to disparity detection rely heavily upon accurate registration between two images so that the subtraction (which may be carried out piecewise for a small areas of the total image) takes place between picture elements that correspond to the same points on the original object pictured in the two images. The resulting difference-image highlights those areas that correspond to differences in the original images. This becomes extremely difficult if noise is present as uncertainty is introduced into the estimate of the correct registration position and many spurious differences can be generated as a result.

Even if noise is absent local distortions or slight subject movements will cause mis-registration and areas of difference will be highlighted which are of little interest unless the distortion or movement itself is being measured. Linear or non-linear digital image registration techniques prior to subtraction partially compensates but does not eliminate this problem in a large proportion of cases [4].

A severe problem faced by conventional methods arises from the different conditions under which the two images were created. Such differences may stem from the lighting, weather conditions, a slightly different viewpoint, a different make of film, or a different camera with a different optical system. These interferences all contribute towards the generation of spurious differences between the images that do not relate to the content.

Differences between the two images caused by the conditions of image capture will be factored out by this method because such differences will affect the score equally across all parts of the image and will not disturb the rank ordering of the individual scores. Significant illumination differences between the two images are compensated by employing a larger threshold for the picture element matching ($\delta_j$ see above). This would be necessary, for example, if X-ray exposure times were different between the two images.

This method also has the advantage of being able to detect multiple disparities in which image A is compared with images B1,B2,B3 etc. This would be useful in the case of CCTV intruder detection in which image frames B1,B2,B3 etc would be typical examples of different atmospheric conditions and other normal background states, and an alarm would be raised only if disparities were detected in all the normal image frames.

It will be seen that these methods have relevance to almost all applications requiring pattern recognition:

Face recognition, fingerprint recognition, OCR, image retrieval, trademark identification, forgery detection, surveillance, medical diagnosis, and others.

They are particularly relevant to the medical industry where the comparison of very variable and noisy images is necessary to track the progress of medical conditions. For example, the identification of likely cancerous growth in mammograms is often gleaned from X-rays taken at different times and any automatic assistance would increase radiologist's throughput. In another example, contrast enhancement is normally obtained by subtracting the X-ray image of the normal breast from one taken after contrast injection and obtaining proper registration is not only difficult to obtain but is critical to the success of the process. The methods we have described can provide a clearer result without the attendant registration problems.

Advanced software detection systems for mammograms (eg. http://www.r2tech.com/prd/) are quite capable of spotting specific features commonly associated with cancer (eg microcalcifications), but the problem of temporal comparisons is largely not addressed.

REFERENCES

[1] Vailaya A et al., Image Classification for Content-Based Indexing, IEEE Trans on Image Processing, Vol 10, No 1, pp 117-130, January 2001.

[2] Santini S & Jain R, Similarity Matching, in Proc $2^{nd}$ Asian Conf on Computer Vision, pages II 544-548, IEEE, 1995.

[3] IEEE Trans PAMI—Special Section on Video Surveillance, vol 22 No 8, August 2000.

[4] Brown L G, A survey of image registration techniques, ACM Computing Surveys, Vol. 24, No. 4 (December 1992), pp. 325-376.

What is claimed is:

1. A method of comparing a first pattern represented by a first ordered set of elements each having a value with a second pattern represented by a second ordered set of element each having a value, comprising performing, for each of a plurality of elements of the first ordered set the steps of:
 (i) selecting from the first ordered set a plurality of elements in the vicinity of the element under consideration, the selected elements having, within the ordered set, respective mutually different positions relative to the element under consideration;
 (ii) selecting an element of the second ordered set;
 (iii) comparing the selected plurality of elements of the first ordered set with a like plurality of elements of the second ordered set each of which has within the second ordered set the same position relative to the selected element of the second ordered set as a respective one of the selected plurality of elements of the first ordered set has relative to the element under consideration, said comparison comprising comparing the value of each of the selected plurality of elements of the first ordered set with the value of the correspondingly positioned element of the like plurality of elements of the second ordered set in accordance with a predetermined match criterion to produce a decision that the plurality of elements of the first ordered set matches the plurality of elements of the second ordered set;
 (iv) repeating said comparison wherein at least some comparisons are made with a fresh selection of the plurality of elements of the first ordered set and at least some comparisons are made with a fresh selection of an element of the second ordered set; and
 (v) generating for the element under consideration a similarity measure as a function of the number of comparisons for which the comparison indicates a match.

2. A method according to claim 1 in which the plurality of elements of the first ordered set includes the element under consideration.

3. A method according to claim 1 in which the selection of the plurality of elements of the first ordered set is random or pseudo-random.

4. A method according to claim 1 in which the selection of an element of the second ordered set is random or pseudo-random.

5. A method according to claim 1 in which, following a comparison resulting in a match decision, a further comparison is performed with a fresh selection of the plurality of elements of the first ordered set and the same selection of an element of the second ordered set.

6. A method according to claim 1 in which, following a comparison resulting in a decision that there is no match, a further comparison is performed with a fresh selection of an element of the second ordered set and the same selection of the plurality of elements of the first ordered set.

7. A method according to claim 1, in which each value comprises a plurality of components.

8. A method according to claim 1, in which the comparison is performed a predetermined number of times.

9. A method according to claim 1, in which the similarity measure is a function of the number of comparisons for which the comparison indicates a match, excluding an initial number of comparisons.

10. A method according to claim 1 in which, when an element under consideration has resulted in a similarity measure indicative of a large number of matches and a further element of the first ordered set is to be considered, the first selection of an element of the second ordered set for comparison therewith is of that element of the second ordered set whose position, within the second ordered set, relative to an element of the second ordered set giving rise to said large number of matches, is the same as the position of the farther element of the first ordered set relative to the previous element under consideration.

* * * * *